3 Sheets—Sheet 1.

L. DUNNE.
Electric-Recorders.

No. 206,304. Patented July 23, 1878.

WITNESSES
Robert Everett
James J. Sheehy

INVENTOR.
Lawrence Dunne
Gilmore Smith & Co.
ATTORNEYS.

3 Sheets—Sheet 2.

L. DUNNE.
Electric-Recorders.

No. 206,304.  Patented July 23, 1878.

WITNESSES
Robert Everett
James J. Sheehy

INVENTOR.
Laurence Dunne.
Gilmore, Smith & Co.
ATTORNEYS.

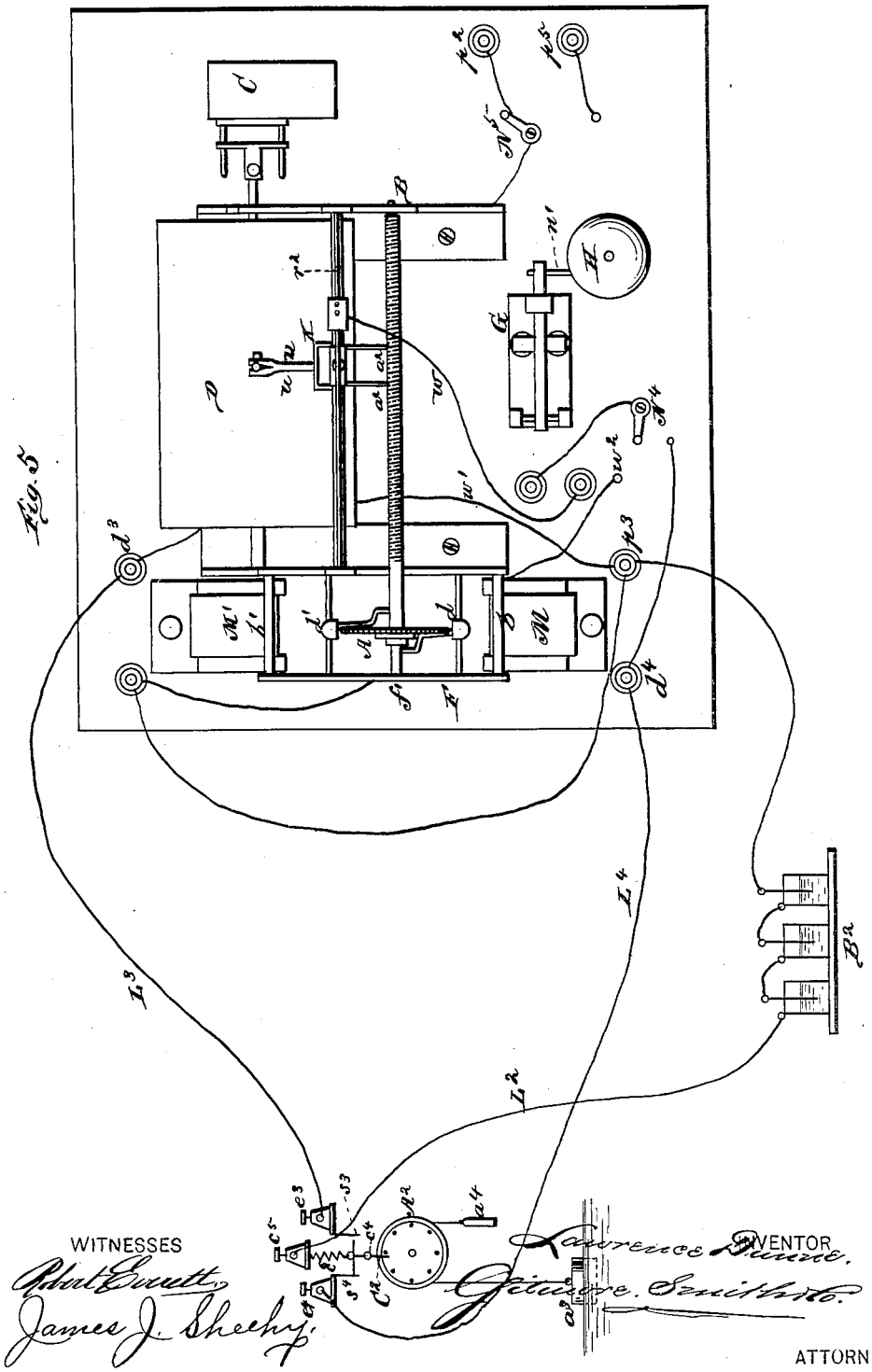

UNITED STATES PATENT OFFICE.

LAWRENCE DUNNE, OF MORGANTOWN, WEST VIRGINIA.

IMPROVEMENT IN ELECTRIC RECORDERS.

Specification forming part of Letters Patent No. 206,304, dated July 23, 1878; application filed May 18, 1878.

*To all whom it may concern:*

Be it known that I, LAWRENCE DUNNE, of Morgantown, in the county of Monongalia and State of West Virginia, have invented a new and valuable Improvement in Electric Recorders; and I do hereby declare that the following is a full, clear, and exact description of the construction and operation of the same, reference being had to the annexed drawings, making a part of this specification, and to the letters and figures of reference marked thereon.

Figure 1:
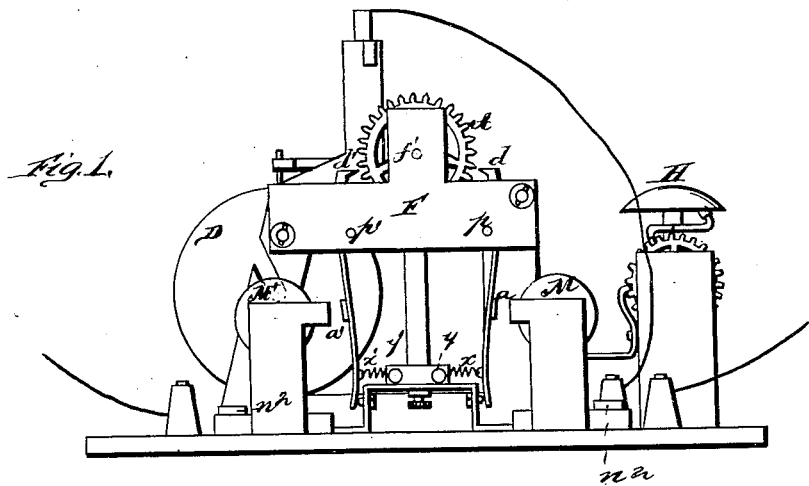
Figure 2:
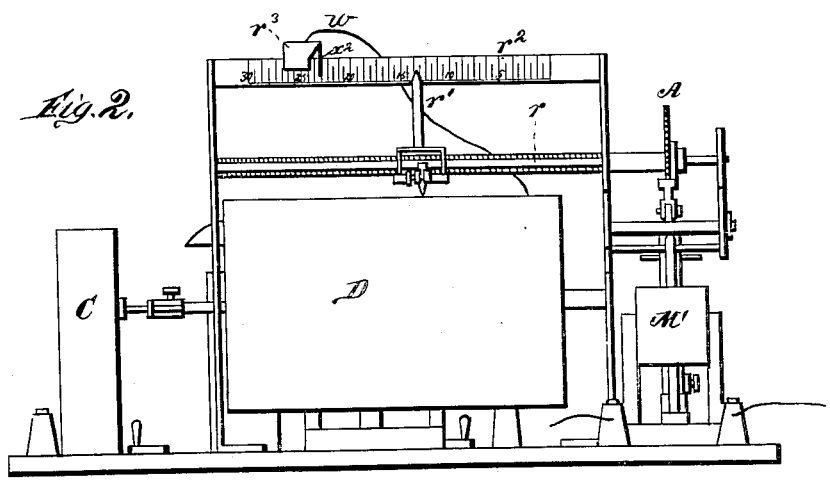
Figure 3:
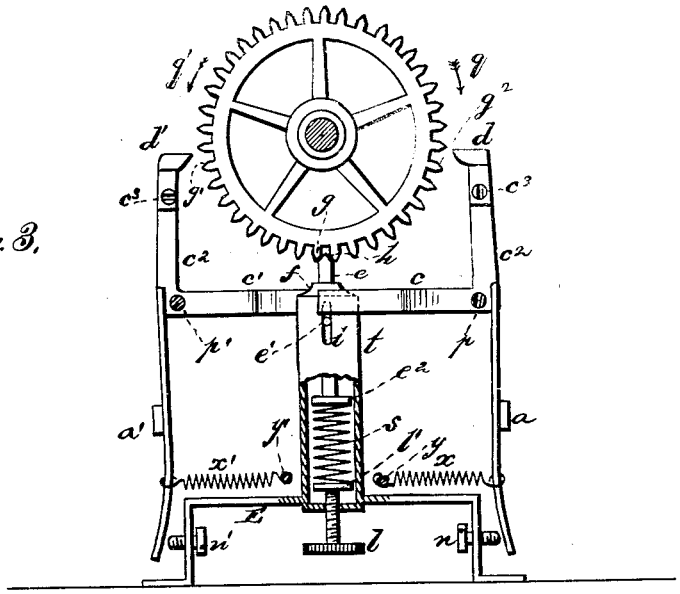
Figure 4:
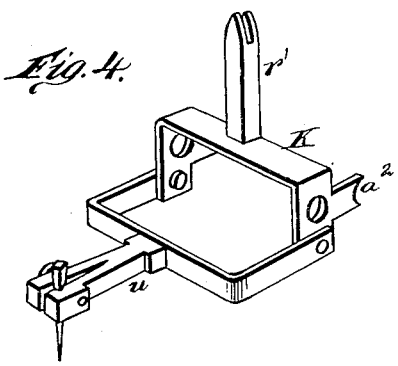

Figure 1 of the drawings is a representation of a front view of my electric recorder. Fig. 2 is a side view; Fig. 3, sectional detail. Fig. 4 is a perspective detail. Fig. 5 is a plan view of the same.

The object of this invention is to produce an electrical recording-instrument by the intermittent action of electro-magnets placed in an electric circuit and acting independently of each other on a single wheel, having teeth, whenever the circuit is closed, and thereby causing the wheel to move forward or backward the space of one tooth at a time, and no more, and give motion to a pencil bearing on a piece of prepared paper to receive the record, which paper is placed on a drum revolved by clock-movement once in twenty-four hours, in seven days, a fortnight, or a month, or for any other desired period of time. The mark made by the pencil, in consequence of the forward or backward motion of the wheel and the moving paper, will be a zigzag line. This instrument is adapted for almost any variety of recording purposes—for instance, such as high and low water in rivers, harbors, reservoirs, canals, &c., steam-boilers, for pressure, such as atmosphere or steam, for temperature, as of air, blast-furnaces, &c.

A common alarm is attached to the instrument for the purpose of giving warning whenever the record has reached any particular stage necessary to be known to parties.

In the drawings, A represents a toothed wheel, having the teeth and spaces of the form shown, the teeth being tapered to a flat edge, and the spaces between the teeth having two obtuse angles at each base. The shaft of this wheel is pivoted at $f'$ in the frame F, and one of the standards B at the other end. The pallets $d$ $d'$ are connected with the arms $c^1$ $c^1$ by the elbows $c^2$ $c^2$. The pallets when at rest are just clear of the teeth of the wheel A. The detent $e$ is placed within a tube, $t$, and passes through a hole in the screw-cap $f$. This detent has a stud, $e^1$, passing through it and projecting some distance beyond, and passing through the slots $i$ on opposite sides of the tube $t$. The detent $e$ is acted upon by the spring $s$ in the tube $t$, forcing the angle-point $h$ between the teeth of the wheel A, thereby holding the wheel in one position till released by some one of the electro-magnets M M' acting on the armatures $a$ $a^1$ and forcing the detent $e$ downward by the arms $c$ $c^1$ pressing on the stud $e^1$. The elbows $c^2$ $c^2$ and armatures $a$ $a^1$ are continuations of the arms $c$ $c^1$, secured to a shaft and pivoted at $p$ $p^1$.

The frame F is secured to the frame B by bolts and nuts $b$ $b'$. The arms $c$ $c^1$ pass at opposite sides of the tube $t$, and rest on the studs $e^1$ of the detent $e$. The thumb-screw $l$ has a button, $l'$, on its end, inside the tube, for the purpose of regulating the tension of the spring $s$, acting on the detent $e$, which also has a button at its end $e^2$. The spring $s$ is therefore confined between the detent $e$ and thumb-screw $l$ inside the tube $t$.

Whenever one of the arms $c$ $c^1$ is acted upon through the electro-magnets M M' placed in an electric circuit, (but both cannot be acted upon at the same time, in consequence of the arrangements of the circuits,) the armatures $a$ $a^1$ will be attracted and the arms $c$ $c^1$ will be drawn downward.

Whenever the circuit connected with the magnet M' is closed, said magnet will be excited and the armature $a^1$ will be attracted. The arm $c^1$ at the same time forces down the detent $e$ by its pressing on the stud $e^1$. Before the point $h$ of the detent is released from between the teeth the pallet $d'$ strikes the tooth $g^1$ on its upper face, and as the pallet bears on the tooth the wheel A is drawn downward, or in the direction of the arrow $q'$, more than half of a space between the teeth. During this operation the arm $c$ or pallet $d$ is not disturbed, being held up by means of the spring $x$, its tension being regulated by the thumb-screw $y$. When the circuit is broken the armature $a^1$ ceases to be attracted, and will be acted upon by the spring $x^1$, and the spring $s$, acting upon the detent, will also force back the arm $c^1$ to its original position. At the same time the detent will be forced up and the point $h$ will strike to the right of the tooth $g$, which had been forced past it by the action of the pallet $d'$. Hence, at the same time as the pallet is released from the tooth $g^1$, the wheel will be moved forward the remaining distance of the space by the point $h$ of the detent, completing the forward movement of the wheel A one full space between the teeth; and the wheel is prevented from falling back, and is held in this position till the circuit is again closed. The magnet M is always ready to act the instant the magnet M' ceases. Now, if the current passes through the magnet M, the armature $a$ is attracted, the arm $c$ will be drawn down, the pallet $d$ engages the tooth $g^2$, and the same effects as above described will be produced; but the wheel A in this instance will take a retrograde motion, or in the direction of the arrow $q$.

The pallets $d$ $d'$ are secured to the elbows $c^2$ $c^2$ of the arms $c$ $c^1$ by set-screws $c^3$ $c^3$, or other suitable device, for the purpose of adjusting the pallets to the teeth of the wheel A.

The thumb-screws $n$ $n^1$ in the bed or standard E of the tube $t$ are for adjusting the arms $c$ $c^1$ to the stud $e^1$ of the detent, so as to make them touch. The set-screws $n^2$ $n^2$ are for adjusting the magnets M M' to the armatures $a$ $a^1$.

On the axle of the wheel A is cut a screw-thread, for the purpose of engaging two projections, $a^2$, from the pencil-carriage K, which is guided by the bar $r$, secured between the standards B. The axle of the wheel runs parallel and in rear of this bar.

The upright bar $r^1$ of the carriage K has a slot to engage the graduated bar $r^2$. It acts as an index-hand on the scale, and at the same time gives steadiness to the motion of the pencil-carriage. The bar $r^2$ is graduated to suit the particular record to be made on the paper on the drum D, which is revolved by clock-movement C. The arm $u$ carries the pencil, which is secured by a clamp and screw. The pencil may also be moved by means of a pinion being placed on the axle of the wheel A, and engaging a toothed rack, which is made to carry the pencil, or by means of a cord connecting the pencil-carriage with the wheel, said wheel being placed in a corresponding suitable position to what it is when the screw-axle is adopted.

H is a common alarm, the detent $u^1$ being acted upon by an electro-magnet, G, in an electric circuit. A portion of the main-line currents is diverted through this magnet by means of keys or cut-offs. The circuit for the alarm being closed by a spring, $x^2$, connecting with the wire $w$ through some non-conducting material, $r^3$, carrying it, and which is placed on the graduated bar $r^2$, when the arm $r^1$ or index-hand of the pencil-carriage comes in contact with the spring $x^2$ the circuit for the alarm is closed and completed through the standards of the instrument, and does not in any way divert the current from passing through the magnets M M'.

In Fig. 5 I have shown a plan of a circuit, say, for example, from a water-gage to the register. $A^2$ is a grooved wheel having studs and a cord passing over it, connecting the float $a^3$ with the counter-balance $a^4$. A circuit-closer, $C^2$, in the shape of a T, is pivoted at $c^4$ and held perpendicular by the spring $c^6$, which is connected to the binding-post $c^5$. A wire, $L^2$, is run from this post direct to the battery B, and connected to the positive pole. The line-wires $L^3$ $L^4$ are connected to the binding-posts $e^3$ $e^4$, which are in connection with springs $s^3$ $s^4$. These wires are run to the binding-posts $d^3$ $d^4$ of the magnets in the register. To trace the current, a stud on the wheel $A^2$ comes in contact with the circuit-closer $C^2$, and forces one of the arms to press against one of the springs $s^3$ $s^4$ connected with the posts $e^3$ $e^4$. The connection is shown in this figure with falling water. The current is then traced from the positive pole of the battery through wire $L^2$; through the binding-post $c^5$ to the spring $s^4$; through the wire $L^4$; through falling magnet M and key $N^4$ to the alarm-magnet G; through the wire W, contact having been made by the spring $x^2$ and index-hand $r^1$ of the pencil-carriage K; through the standards B of the register; through the key $N^5$ to the post $p^2$ of the rising magnet M', and thence to the negative pole of the battery, completing the circuit for the alarm and falling water.

If the alarm is not required, the circuit for falling water only is completed through the wire $w^1$ leading to the post $p^3$ of the rising magnet, and thence to the battery, the key $N^4$ of the alarm being turned off.

The circuit for rising water may be traced in the same manner as for falling; but the key $N^4$ must be brought in contact with the wire $w^2$ to direct a portion of the current through the alarm-magnet, the key $N^5$ always remaining closed, as shown, when only one register is placed in the circuit.

The posts $p^5$ are for connecting with other instruments placed in the same circuits, the current passing through all in the same manner, with this exception, that the wire $w^1$ in a single station-circuit would be placed in the last station of a circuit having more than one register and omitted in all the others.

It makes no difference how many registers are placed in circuit. The line-current can never be directed from its through course by opening or closing any of the alarm-keys; let them be turned in every possible direction, it will not interfere with the proper working of the instrument at any point in the circuit.

The arrangement of the above-described circuits avoids the necessity of more than one battery to work the whole line of instruments. No local batteries are required for the alarm, as might be supposed at first glance.

The battery, of course, is placed at the opposite end of the line to that where the circuit is closed at the gage; but at the same time it may be placed close to the gage, if desirable and convenient.

The principal advantage of this instrument is that a zigzag line is obtained by very simple devices, by the use of which the rise and fall of fluids, such as water, &c., are recorded, showing the fluctuations; and at the same time the place where the circuit is closed may be placed at a considerable distance from the register.

What I claim as new, and desire to secure by Letters Patent, is—

1. The wheel A, with teeth tapering to an edge, and having two obtuse angles at their base, in combination with the pallets $d\ d^1$, arms $c\ c^1$, having elbows $c^2\ c^2$, and the armatures $a\ a^1$, as and for the purposes set forth.

2. The slotted tube $t$, detent $e$, having angle $h$, and the studs $e^1$ and button $e^2$, for the purposes set forth.

3. The spring $s$ and thumb-screw $l$, with button $l'$, in combination with the detent, for the purposes set forth.

4. The combination of the detent $e$, screw-cap $f$, springs $x\ x^1$, thumb-screws $y\ y'$, and arms $c\ c^1$, as and for the purposes set forth.

In testimony that I claim the above I have hereunto subscribed my name in the presence of two witnesses.

LAWRENCE DUNNE.

Witnesses:
P. H. KECK,
T. PICKENPAUGH.